United States Patent [19]

Bartholomew

[11] Patent Number: 5,141,262
[45] Date of Patent: Aug. 25, 1992

[54] MEANS OF LOWERING THE OPERATIONAL TEMPERATURE FOR ELASTOMERIC SEALS

[75] Inventor: Donald D. Bartholomew, Mt. Clemens, Mich.

[73] Assignee: Proprietary Technology, Inc., Southfield, Mich.

[21] Appl. No.: 682,845

[22] Filed: Apr. 4, 1991

Related U.S. Application Data

[63] Continuation of Ser. No. 465,057, Jan. 16, 1990, abandoned.

[51] Int. Cl.⁵ .............................. F16L 55/00
[52] U.S. Cl. .................................. 285/187; 285/175; 285/334.5; 285/356; 285/918; 29/512
[58] Field of Search .................... 285/174, 334.5, 356, 285/918, 906, 187, 175; 29/512

[56] References Cited

U.S. PATENT DOCUMENTS

| | | | |
|---|---|---|---|
| 2,310,944 | 2/1943 | Douglass | 285/906 X |
| 2,406,478 | 8/1946 | Snyder | 285/906 X |
| 3,314,696 | 4/1967 | Ferguson et al. | 285/174 |
| 3,367,681 | 2/1968 | Braukman | 285/174 X |
| 3,957,293 | 5/1976 | Rodgers | 285/174 |
| 4,068,867 | 1/1978 | Rodgers | 285/174 |
| 4,163,573 | 8/1979 | Yano | 285/174 |
| 4,615,547 | 10/1986 | Sutcliffe et al. | 265/918 X |

Primary Examiner—Dave W. Arola
Attorney, Agent, or Firm—Harness, Dickey & Pierce

[57] ABSTRACT

A means is disclosed by which the operational temperature of a sealed relatively rotating device may be achieved at lower than recommended operational temperatures for the elastomer compound used as the sealing material.

2 Claims, 2 Drawing Sheets

MEANS OF LOWERING THE OPERATIONAL TEMPERATURE FOR ELASTOMERIC SEALS

This is a continuation of U.S. patent application Ser. No. 07/465,057, filed Jan. 16, 1990, entitled MEANS OF LOWERING THE OPERATIONAL TEMPERATURE FOR ELASTOMERIC SEALS now abandoned.

BACKGROUND OF THE INVENTION

1. Technical Field

This invention relates to a means of lowering the operational temperature for elastomeric seals and, more particularly, to a specifically shaped seal configuration which limits relative axial movement.

2. Discussion

The elastomeric seal is used in a number of applications where fluids are being transmitted. It is desired to use particular elastomeric compounds in the seals, because of that compound's resistance to a chemical, or range of chemicals.

Traditionally due to the structure and composition of seals, leakage tends to occur over time when chemical fluids are transmitted through the sealed area. This is especially true of fluroelastomers when the chemical fluids are at temperatures lower than minus 25° Fahrenheit. The problem arises because the elastomer fails to recover from a deformation within the time required to maintain the sealed relationship between the components being sealed. The problem is not one of the diameters which confine the seal, or the gland link that confines the seal, because they are constant at the temperature and because of thermal inertia do not change more rapidly than the seal can accommodate. The problem is with changes in the coaxiality of the two diameters. In normal situations, the non-rotating relative movements of the two components which are caused by forces developed as a result of movements which are a part of the dynamic operation of the machine or device for which the seal connection is a portion of, cause a changing coaxiality of the two diameters which is limited in off coaxiality movement by the physical structure of the sealed joint.

Normal manufacturing tolerances yield limits to this relative axis movement which are in excess of the seal material's ability to follow these changes by changing shape and thus maintain the seal. When this condition exists, the seal is not operative, and will leak.

There is however, a method of establishing a situation where these relative axial movements are limited to a much greater extent, that permits the seal to be operational to a much lower temperature, while still allowing relative rotation of the two components.

By using a bearing system for the two components that allows rotation, but limits axial differences to less than those which can be followed by the seal, the maintenance of a sealed relationship is possible. By reaming holes of repeatable size and sizing of outside diameters in the areas of the interior part of the rotating combination, it is possible to achieve the required limitations for seals of even and O-ring configuration that allow a sealed relationship of rotating parts at temperatures lower than those that can be achieved by normal methods of fabrication, which do not achieve the very close fits required.

It is not a situation that requires a new fabrication ability, or a special manufacturing process for seals, it is the recognition that by doing things this way that it is possible to lower acceptable operating temperatures. Also, it is possible to have one of the components which confine the seal form the other, and achieve a line to line rotating fit.

SUMMARY OF THE INVENTION

In accordance with the preferred embodiment, a means by which the operational temperature of a sealed relatively rotating device may be achieved at lower than recommended operational temperatures for the elastomer compound being used for the sealed material. The figures demonstrate what is done to achieve this condition for a device which threads into a port, and has a swivelling portion that connects to a component of a piping system which contains a fluid containing chemicals which dictate the use of a fluroelastomer seal.

OBJECTIVES OF THE INVENTION ARE:

1. To permit the use of elastomer compounds at temperatures that are lower than those recommended for normal use of the compound.

2. To show that it is possible to construct a device capable of improved performance by use of currently known technology.

3. To show that it is possible to construct a device for making sealed connections in a manner that is consistent with the desire to provide a right angle conduit terminating fitting, which is less sensitive to connecting leakage problems, and has a minimized projection from the surface of the port being connected.

BRIEF DESCRIPTION OF THE DRAWINGS

The various advantages of the present invention will become apparent to one skilled in the art upon reading the following specification, and by reference to the drawings in which.

DESCRIPTION OF THE PREFERRED EMBODIMENT

Figure 1:
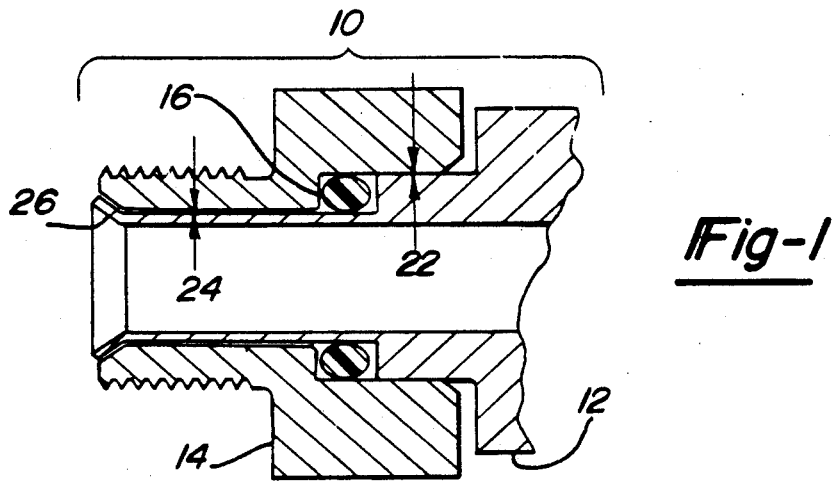
FIG. 1 shows a cross-section of a portion of the screwed-in fitting.

In FIG. 1 a portion 10 of a screw-in tapered pipe thread fitting is shown. A swivelling nut 14 is placed over body 12, so as to confine the fluroelastomer O-ring seal 16. In the normal manufacture, the clearance 22 and 24 between nut 14 and body 12 would allow a movement of axis (not shown) of the nut 14 relative to the axis (not shown) of the body 12 of approximately 0.004 of an inch. This would result in an accommodation by seal 16 of 0.008 of an inch if the nut 14 were moved fully from one extreme to the opposite extreme on the body 12. When this axis displacement occurs, seal 16 is first required to compress on the side where the material of nut 14 touches body 12, and expand removing some of the initial pressure on the seal on the opposite side. When nut 14 is moved in the opposite direction so that the material of nut 14 touches the material of body 12 on the opposite side of body 12, the material of seal 16 in the previously more compressed area must now expand to follow the inside surface of nut 14 which is now moving away from the stem of body 12. This is where the problem arises at cold temperatures. The material will not expand quickly enough to follow, and a leak will result.

If the method shown herein is applied, unusual steps will be taken to reduce the normal clearance between nut 14 and body 12. It is more costly, and not normally done, but there are production sizing methods that may be employed when manufacturing components of the round shape shown, that can reduce the clearance by a factor of 10. The resulting 0.0004 inch clearance between nut 14 and body 12 is seen to reduce the amount of accommodation required of seal 16 during the movement of nut 14 relative to body 12 that was previously described. This reduction in required seal 16 accommodation effectively lowers the seal operating temperature to some colder condition where the material of seal 16 can again no longer respond quickly enough to maintain sealing. In FIG. 1, a flaring 26 of the end of the body 12 stem serves to retain nut 14 on body 12 after the installation of nut 14 and seal 16 on body 12. Nut 14 is free to rotate on body 12, but there is very little clearance for departure from a coaxial condition between the axis of the two components.

Figure 2:
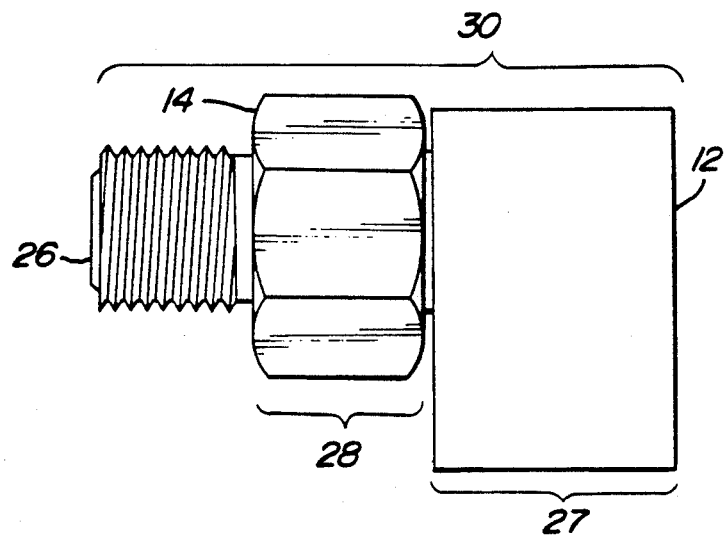
FIG. 2 shows a device with the means described as a fitting for two threaded connections.

In FIG. 2 a fitting 30 consisting of the parts of FIG. 1, with a port area about flared area 26, and a threaded port area 27 is shown. To achieve a condition wherein the reliability of success on the initial try of sealing nut 14 into a mating threaded port is vastly improved because there is no need for future loosening of nut 14 to orient body 12 to align with the axis direction of the fitting end which is attached to port 27 of body 12, a length penalty of the nut wrenching distance 28 is accommodated in the installation. This distance 28 would normally be somewhat like ⅜ inch, so fitting 30 would normally be about ⅜ inch longer than a fitting with the same ports, but without the ability of body 12 to be swivelly oriented after the fitting was sealingly screwed into a mating port. The fitting 30 will accommodate any axis orientation of the fitting (not shown) which is screwed into port 27, that is within a plane that is perpendicular to the axis of nut 14 and body 12 stem port area around flared portion 26.

Mating fitting axis variations that are not in the perpendicular plane are the cause of many additional problems that are related to the threading in of the fitting which is screwed into the port 27 of body 12. For this reason the fitting 30 configuration solves some of the mating fitting problems, but not all of the mating fitting problems. To the extent that the ability of fitting 30 is able to accommodate the axis of the fitting screwed into port area 27, fitting 30 will serve to further reduce the chance of a leaking non-sealed joint.

Figure 3:
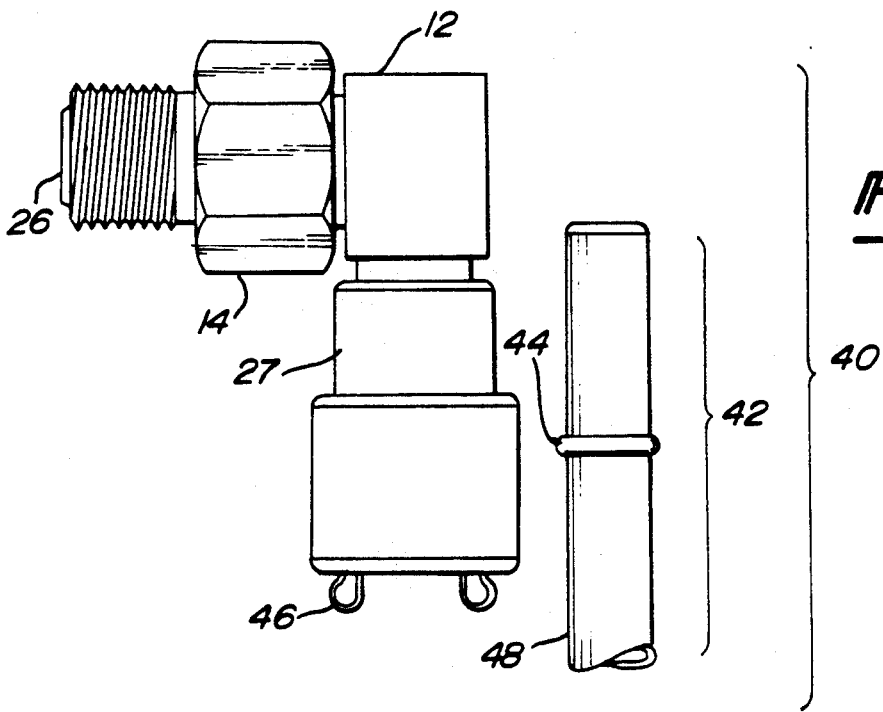
FIG. 3 shows a device with the means described as a fitting with one threaded and one non-threaded connector port.

In FIG. 3 a fitting 40 that is to be used as described in FIGS. 1 and 2 is shown, but port area 27 is a female of the non-threaded connector. The connecting fitting 42 is a formed end of a piece of metal tubing 48. The fitting 42 is shown outside the female port 27 in the approximate position that it would occupy if installed into female port 27. Locking of the fitting 42 into female port 27 is accomplished by a retainer (not shown) inside port 27 which engages the surface of tube 48 and bead 44 a portion 46 of the retainer projects from female port area 27 to act as a releaser for cases wherein installed fitting 42 may be released and withdrawn from female port 27.

The advantage of this configuration is that female port 27 will accept fitting 42 at angles of its axis that are up to 10° mismatch with the perpendicular axis plane described in FIG. 2. Since no threading is required to make the joint, or connection most of the remaining problems of leakage initially or in subsequent connecting are avoided.

Figure 4:
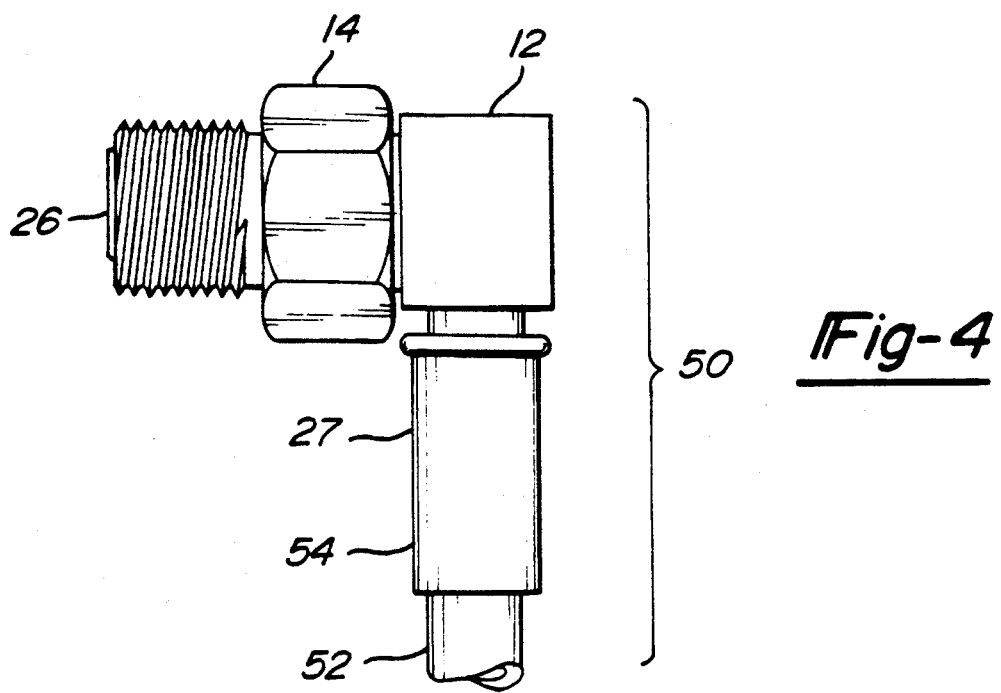
FIG. 4 shows a device with the means described as a fitting with one threaded and one sleeve lock (patent pending) connection.

In FIG. 4 the fitting of FIG. 1 or 2 where the port area 27 is a "sleeve lock" 50 is shown. The sleeve lock is a patent pending method of attaching flexible hose or plastic tubing 52 over a specially shaped male stem (not shown), and locking the hose or tube 52 to the male stem by means of the sleeve 54. This method of attachment of hose or tube 52 replaces the older hose clamp or crimped ferrule method of making the attachment. It is also evident that sleeve 54 could represent a hose clamp or crimped ferrule, in which case the male stem (not shown) would be especially shaped for those methods of attachment.

What is claimed is:

1. A method for assembling a fitting assembly which provides for sealed operation at lowered temperatures comprising:

providing a first fitting which includes a projecting stem having a free end extending therefrom and a step portion between the stem and fitting;

positioning a second fitting substantially coaxially about said stem such that a portion of said free end extends beyond said second fitting and said second fitting including a central bore having a diameter enabling said second fitting to be positioned on said stem, one end of said central bore having an enlarged bore portion for enabling said second fitting to position on said step portion such that there is a close tolerance between said enlarged bore portion and said step portion, and the other end of said central bore having a conical bore portion said second fitting also including a portion above said second enlarged bore extending from the threads, on said threaded extending portion, to the end thereof providing a wrenching engaging surface of uniform size which provides distance between a port and a portion of said first fitting perpendicular to the axis of said second fitting enabling a sufficient distance to secure an additional fitting to said first fitting perpendicular portion without removal of said second fitting from its mating port;

positioning a single fluroelastomeric seal means about said stem for sealing said first and second fittings such that said seal means is in sealing contact with said first and second fittings and is positioned adjacent said step portion;

deforming said seal means upon positioning said second fitting on said first fitting such that said close tolerances provide reduced accommodation to off-axis movement between said first and second fittings and providing operation at temperatures below temperatures where said seal means normally will not respond quickly enough to maintain sealing contact between said fittings; and flaring said extending portion of said free end of said stem such that said flare seats in said conical bore portion to retain said second fitting on said first fitting such that said first fitting is swivelable in said second fitting after said second fitting is secured in its mating port.

2. A fitting assembly for low temperature operations comprising:

a first fitting having a body portion and an elongated extending stem portion with an axial bore extending there through a step portion formed between the body and stem portions;

a second fitting having a body portion and a threaded extending portion, an axial bore through said second fitting enabling said second fitting to fit over said stem portion, be rotatable thereon and be substantially coaxial with said first fitting, said axial bore having an increased diameter portion in said body portion for enabling said bore increased diameter portion to surround said step of said first fitting such that there is a close tolerance between said enlarged bore portion and said step portion, and the other end of said axial bore having a conical bore portion said second fitting also including a portion above said second enlarged bore extending from the threads, on said threaded extending portion, to the end thereof providing a wrenching engaging surface of uniform size which provides distance between a port and portion of said first fitting perpendicular to the axis of said second fitting enabling a sufficient distance to secure an additional fitting to said first fitting perpendicular portion without removal of said second fitting from its mating port;

a single fluroelastomeric O-ring surrounding said stem adjacent said step for sealing said first and second fittings said seal means deforming upon positioning said second fitting on said first fitting such that said close tolerances provide reduced accommodation to off-axis movement between said first and second fittings; and a flare portion at a free extending end of said stem such that said flare seats in said conical bore portion for retaining said second fitting on said first fitting such that said first fitting is swivelable in said second fitting after said second fitting is secured in its mating port.

* * * * *